US009165531B2

United States Patent
Tse et al.

(10) Patent No.: US 9,165,531 B2
(45) Date of Patent: Oct. 20, 2015

(54) SYSTEM FOR DETECTING DISPLAY DRIVER ERROR WHEN FAILING TO RECEIVE A SYNCHRONIZATION SIGNAL AND METHOD THEREOF

(71) Applicant: Google Technology Holdings LLC, Mountain View, CA (US)

(72) Inventors: Lighten Tse, Round Lake, IL (US); John J Gorsica, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 117 days.

(21) Appl. No.: 14/075,131

(22) Filed: Nov. 8, 2013

(65) Prior Publication Data

US 2014/0347340 A1   Nov. 27, 2014

Related U.S. Application Data

(60) Provisional application No. 61/827,724, filed on May 27, 2013.

(51) Int. Cl.

| | |
|---|---|
| *G06F 3/038* | (2013.01) |
| *G09G 5/00* | (2006.01) |
| *G09G 5/18* | (2006.01) |
| *G09G 3/32* | (2006.01) |
| *G09G 3/36* | (2006.01) |
| *G06F 11/07* | (2006.01) |

(52) U.S. Cl.
CPC .............. *G09G 5/18* (2013.01); *G06F 11/0736* (2013.01); *G06F 11/0757* (2013.01); *G09G 3/3208* (2013.01); *G09G 3/3611* (2013.01)

(58) Field of Classification Search
USPC ......................................................... 345/213
See application file for complete search history.

(56) References Cited

U.S. PATENT DOCUMENTS

| | | |
|---|---|---|
| 2008/0174540 A1 | 7/2008 | Lee |
| 2010/0306789 A1 | 12/2010 | Sahashi |
| 2013/0021306 A1 | 1/2013 | Kuo et al. |

(Continued)

FOREIGN PATENT DOCUMENTS

| | | |
|---|---|---|
| EP | 0676696 A1 | 10/1995 |
| WO | 2014/193673 A1 | 12/2014 |

OTHER PUBLICATIONS

International Search Report and Written Opinion for PCT Patent Application No. PCT/US2014/038541, mailed on Sep. 23, 2014, 10 pages.

(Continued)

*Primary Examiner* — Long D Pham

(57) ABSTRACT

A system performs a method for detecting display driver error. The method includes sending a first command signal to a display driver to operate according to a first operating state that includes the display driver sending a synchronization signal, and monitoring for the synchronization signal during a first time period after sending the first command signal. The method further includes sending a second command signal to the display driver to operate according to a second operating state that includes the display driver withholding sending the synchronization signal, and monitoring for the synchronization signal during a second time period after sending the second command signal. In addition, the method includes detecting a display driver error based on results of the monitoring during at least one of the first or the second time periods.

20 Claims, 4 Drawing Sheets

(56) References Cited

U.S. PATENT DOCUMENTS

| | | |
|---|---|---|
| 2013/0057763 A1 | 3/2013 | Cha et al. |
| 2013/0155036 A1* | 6/2013 | Kim et al. ............... 345/204 |
| 2014/0173320 A1* | 6/2014 | Tripathi ............... 713/375 |
| 2014/0184629 A1* | 7/2014 | Wyatt et al. ............... 345/547 |

OTHER PUBLICATIONS

Silberschatz et al., "Operating System Concepts—Third edition", Jan. 1, 1991, pp. 480-481.

Tanenbaum et al., "Computer Networks—Fifth Edition", Jan. 1, 2011, pp. 534-535.

\* cited by examiner

SYSTEM FOR DETECTING DISPLAY DRIVER ERROR WHEN FAILING TO RECEIVE A SYNCHRONIZATION SIGNAL AND METHOD THEREOF

RELATED APPLICATIONS

This application is a non-provisional application of commonly assigned U.S. Provisional Patent Application No. 61/827,724, filed on May 27, 2013, from which benefits under 35 USC §119(e) are hereby claimed and the contents of which are hereby incorporated by reference herein.

FIELD OF THE DISCLOSURE

The present disclosure relates generally to error detection features for systems that display image data and more particularly to a method and system for detecting display driver error.

BACKGROUND

Systems that present photo or video data to a user include electronic components, such as a display driver integrated circuit (IC) also referred to herein simply as a display driver or a driver, which are susceptible to errors. Some errors result from internal software process or hardware malfunctions. Other errors result from external influences such as electrostatic discharge, which can damage the electronic component.

A conventional solution to detect display driver errors requires a bi-directional communication interface between a control processor and the display driver, where the control processor requests the content information of a register in a memory of the display driver. When the contents are different than expected, the control processor detects a display driver error.

One problem is that systems that do not have this bi-directional communication interface between a control processor and display driver cannot use the above conventional display driver error detection procedure. Moreover, the above conventional error detection procedure suffers from statistical uncertainty. More particularly, the procedure does not check the contents of each register within the display driver. Therefore, although a specific register may come back with valid content information, this is not a guarantee that other registers within the display are not corrupted.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
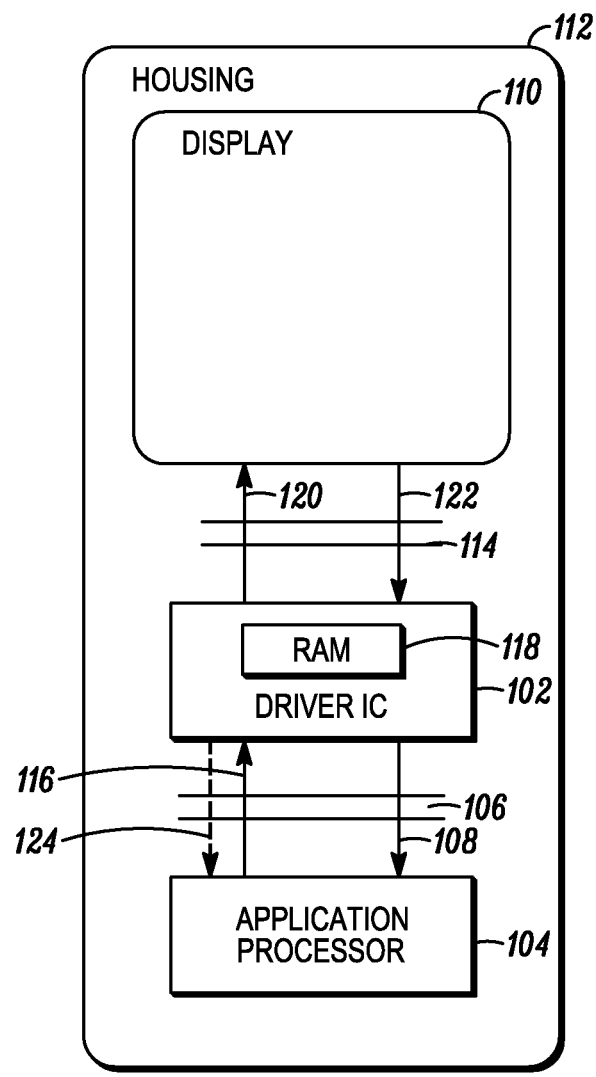
FIG. 1 illustrates a system diagram including apparatus for detecting display driver error in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure herein.

The apparatus and method components have been represented where appropriate by conventional symbols in the drawings, showing only those specific details that are pertinent to understanding the embodiments of the disclosure herein so as not to obscure the disclosure with details that will be readily apparent to those of ordinary skill in the art having the benefit of the description herein.

DETAILED DESCRIPTION

Generally speaking, pursuant to the various embodiments, a system presents video data using a display driver, which is susceptible to errors. Embodiments described herein detect when a display driver error exists by monitoring for a correct synchronization signal response with respect the display driver being commanded to operate in a particular state or mode, such as an on ("ON") state or an off ("OFF") state. In accordance with some embodiments, a user is provided with a more seamless use of the system or a decreased perceptible down time resulting from display driver error by use of the method and system of detecting display driver error as described herein.

In one example embodiment, a method for detecting display driver error includes: sending a first command signal to a display driver to operate according to a first operating state that includes the display driver sending a synchronization signal; and monitoring for the synchronization signal during a first time period after sending the first command signal. The method further includes detecting a display driver error upon failing to receive the synchronization signal during the first time period.

In another embodiment, a system provides for detecting display driver error. The system includes a display driver configured to send a synchronization signal after receiving a first command signal to operate according to a first operating state. The system further includes a processor that is coupled to the display driver over an interface. The processor is configured to: send the first command signal; initiate a timer for a first time period; and monitor for the synchronization signal during the first time period. The processor is further configured to detect a display driver error upon failing to receive the synchronization signal during the first time period.

In another example embodiment, a method for detecting display driver error includes sending a first command signal to a display driver to operate according to a first operating state, which includes the display driver sending a synchronization signal, and monitoring for the synchronization signal during a first time period after sending the first command signal. The method further includes sending a second command signal to the display driver to operate according to a second operating state, which includes the display driver withholding sending the synchronization signal, and monitoring for the synchronization signal during a second time period after sending the second command signal. The method further includes detecting a display driver error based on results of the monitoring during at least one of the first or the second time periods.

Referring now to the drawings, FIG. 1 illustrates an embodiment of a system 100 for detecting display driver error, in accordance with the present disclosure. FIG. 1 illustrates example hardware, which may operate using one or more software modules or routines, which perform embodiments of the methods described herein. In the embodiment illustrated in FIG. 1, the system 100 is an electronic device that has a housing 112 that includes a number of electronic components, at least some of which operate to perform embodiments of methods described herein. Thus the terms electronic device and system are in some instances used interchangeably herein. The electronic components shown include: a processor 104, which in this case is an application processor; a display driver IC 102 having a random access memory (RAM) 118; and a display 110.

In alternative embodiments, some of the components shown, such as the driver 102 and the processor 104, are housed separately from the housing 112 that houses the display 110. For example, in an embodiment, a monitor houses the display 110, and the monitor is coupled to a computer that houses both the driver 102 and the processor 104. In a different embodiment, the driver 102 and the processor 104 are also housed separately from each other. Moreover, other electronic components of the electronic device 100 are not shown in an effort to focus on the disclosed embodiments and to keep the detailed description to a practical length. Such other components include, but are not limited to, additional processors and memory components, transceivers, additional Input/Output (I/O) devices such as a keyboard, speakers, and microphones, etc.

Furthermore, although the driver 102 and application processor 104 are shown as separate components, in an alternative arrangement, these components are included within a single package such as on a single IC chip. Accordingly, system 100 may be implemented as any number of different types of electronic devices. These electronic devices include, by way of example, a computer and a monitor, a digital television, a laptop, a smartphone, a personal data assistant (PDA), a digital media player, a portable or mobile phone, a cellular phone, a personal wearable device, a tablet, a personal gaming system, a gaming system console, a handheld gaming system, a notebook computer such as a netbook or an eReader, etc.

The application processor 104 supports video and other image-related and/or multimedia applications executable on the system 100, which communicates image data to and from other devices or servers, for example. The application processor 104 also connects to hardware such as cameras that are configured for capturing image data, which can be stored locally in the system 100 and/or communicated outside of the system 100. More particularly, the application processor 104 controls the display of image data on the display 110, by sending command signals (e.g., DRIVER AWAKE, DISPLAY ON, DISPLAY OFF, etc.) and image data to the display driver 102. As used herein, image data, also referred to herein as data, is derived from a picture, for instance in the form of video frames or still image frames also called picture frames.

The application processor 104 is configured to be coupled to the display driver 102 over a physical interface represented by 106 for communicating the command signals and image data. For example, the interface 106 is a physical layer link implemented as one or more pins between two ICs. In a particular embodiment, the physical interface is used to implement one or more logical channels. Examples of such logical channels include, but are not limited to, at least one data channel for communicating data such as image data, a control channel for communicating control data such as commands, and a clock channel for communicating timing information. The interface 106 can be a unidirectional interface from the application processor 104 to the driver 102, as indicated by a link 116. In an alternative embodiment, the interface is a bidirectional interface between the application processor 104 and the driver 102, as indicated by links 116 and 124.

In an embodiment, the interface 106 supports one or more protocols for communicating the image data and control signals. In one particular embodiment, the interface 106 is a unidirectional Mobile Industry Processor Interface (MIPI). In another embodiment, the interface 106 is a unidirectional Mobile Industry Processor Interface. MIPIs support numerous protocols including, but not limited to M-PHY, D-PHY, Display Serial Interface (DSI), MIPI Unified Protocol (UniPro), Low Latency Interface (LLI), SuperSpeed Inter-chip (SSIC), to name a few. As used herein a MIPI is a chip-to-chip interface that conforms to standards created by the MIPI Alliance Standards Body, which standardizes interfaces for mobile applications.

Referring back to FIG. 1, the display driver 102 is configured to operate in accordance with the commands that the application processor 104 provides over the link 116. The display driver 102 stores the image data received over the link 116 in the RAM 118 until it presents a form of the image data to the display 110 to enable the viewing of an image or images represented by the image data. More particularly, while in an operating state wherein the display driver is active (and the display is active), for example, in response to a DISPLAY ON command, the display driver 102 converts the image data into a suitable signal that it provides to the display 110 over a physical interface 114, which can be a link 120 as a unidirectional interface for instance. Alternatively, interface 114 is a bidirectional interface, as represented by links 120 and 122.

In an embodiment, the interface 114 is a wire connection, such as a pin, over which the display driver 102 sends electrical signals at varying voltage levels, which represent the image data stored in the RAM 118. For example, the RAM 118 holds the image data for a single image or picture frame. The display driver 102 loads its RAM content to the display 110 by sending the frame to the display 110 row-by-row or line-by-line (in pixels) until the entire image is sent. In a particular embodiment, the display 110 is an optical display such as a liquid crystal display (LCD) that translates the electrical signals that it receives over the link 120 to optical signals by which the image can be seen through optical effects. For example, each pixel corresponds to a capacitor that is charged and slowly discharged to display the image. In another embodiment, the display 110 is an organic light emitting diode (OLED) display.

When the display driver 102 sends the last pixel of the frame, it waits an amount of time before "refreshing" the display 110 by either sending new image data to the display 110, if the application processor 104 has provided the new image data, or rewriting the current image data to the display 110. This amount of time that the display driver 102 waits is called a "scan retrace period" or "non-display period," which is basically a blanking interval between frames. The scan retrace or non-display period can include at least some portion of a vertical back porch or front porch of the display area. The back porch appears as a black or blank area on the bottom of the display 110 after a final pixel of a current frame is written; and the front porch appears as a black or blank area on the top of the display 110 before a first pixel of a frame is written.

During the scan retrace period, the display driver 102 sends a synchronization signal to the application processor 104 over a link 108, which can be an output pin. During the active state (also referred to herein as the "first" operating state) the display driver 102 sends the current data (also referred to as "first" data) for a picture frame, for instance the entire current contents of RAM 118, to display 110. In this case, the synchronization signal is synchronized to the display driver 102 completing the sending of the first data to the display. The synchronization signal is, thereby, used to synchronize receipt by the display driver 102 of the next image data (also referred to as "second" data) from the application processor 102, so that the display driver 102 can send the next image to the display 110.

In an embodiment, the synchronization signal is a "tearing effect" (TE) signal that is a signal sent over a TE pin, e.g., 108, to prevent screen tearing while displaying a frame on the display 110. Screen tearing is a visual artifact in video display where a display device or component shows information from two or more frames in a single screen draw. The artifact occurs, for instance, when the video feed to the display is not in sync with the display's refresh. During video motion, screen tearing creates a torn look as edges of objects. The TE signal synchronizes when the display can be updated without getting any tearing effects. This signal basically indicates the scan retrace period of the display, which can be used to update the RAM 118; and the update is shown in the next scan period. In a particular embodiment, during the non-display period, the TE goes high, which enables the application processor 102 to write new image data to the display driver RAM 118 by observing the TE pin to avoid tearing.

For time to time during operation, the display driver 102 may enter into a "lock-up state", where the display driver is no longer operating properly. For example, the display driver 102 is no longer writing to the display 110, even though the application processor 104 has commanded the display driver 102 to the active state. Alternatively, the application processor has commanded the display 110 to a sleep state, but the display driver 102 continues to refresh the display 110. This display driver lock-up state is also referred to herein as display driver error. In accordance with embodiments of the present teachings, for example as illustrated by reference to the remaining FIGS. 2, 3, and 4, a system such as the system 100 and more particularly a control processor such as the application processor 104 is configured for detecting display driver error according to methods 200, 300, and 400, respectively. "Adapted," "operative," "capable" or "configured," as used herein, means that the indicated elements or components are implemented using one or more hardware devices such as one or more operatively coupled processing cores, memory devices, and interfaces, which may or may not be programmed with software and/or firmware as the means for the indicated elements to implement their desired functionality. Such functionality is supported by the hardware shown in FIG. 1.

Figure 2:
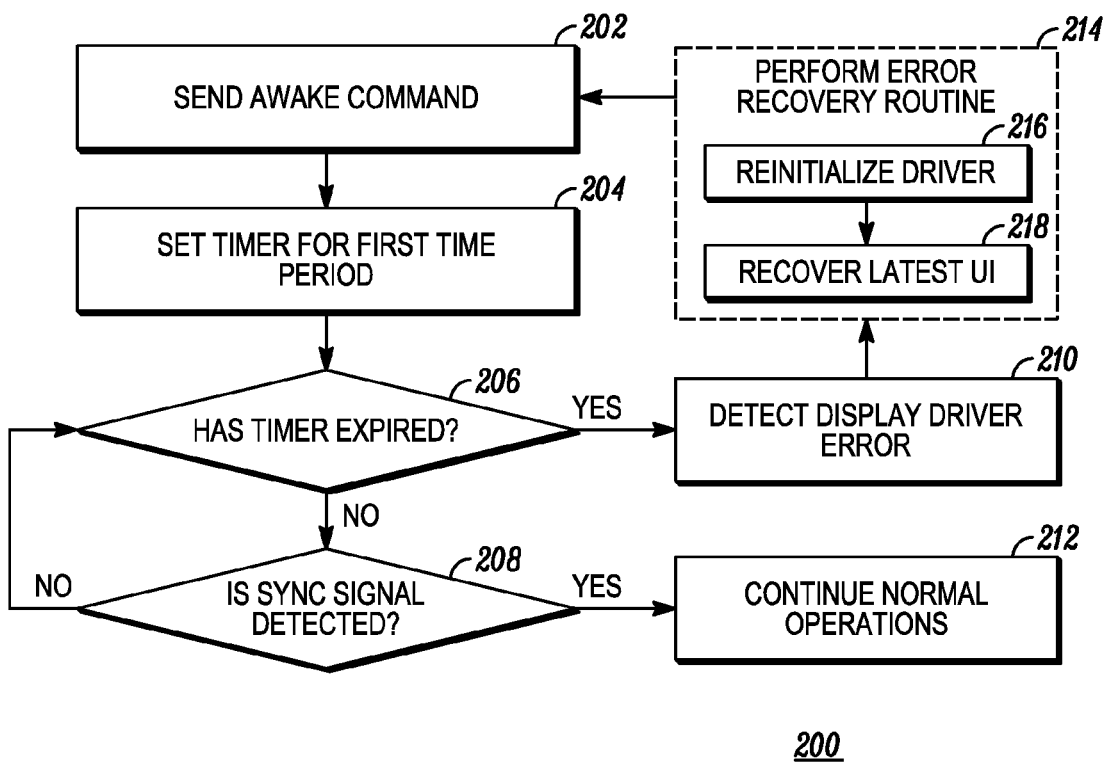
FIG. 2 is a flowchart illustrating a method of detecting display driver error in accordance with an embodiment of the present disclosure.

In the method 200 and 300 embodiments illustrated by reference to FIGS. 2 and 3, respectively, the application processor 104 is configured to detect display driver error upon commanding the display driver 102 to operate according to a first operating state, which controls the display driver 102 to send a synchronization signal to the application processor 104. With reference to FIG. 2, the first operating state includes the display driver 102 awakening from a sleep state and sending the synchronization signal, for instance in response to a command signal from the application processor 104. In a particular embodiment with respect to FIG. 2, the first operating state includes the display driver 102 awakening from a sleep state while the display 110 is in an off state, and sending the synchronization signal to synchronize receipt of first data for a first picture frame. With respect to FIG. 3, the first operating state includes the display driver 102 operating in an active state, and sending the synchronization signal to synchronize the application processor 104 writing new image data to the RAM 118. In the method 400 embodiment illustrated by reference to FIG. 4, the application processor 104 is configured to detect display driver error upon commanding the display driver 102 to operate according to a second operating state, which controls the display driver 102 to withhold sending the synchronization signal.

Referring now to the method 200 embodiment illustrated in FIG. 2, the application processor 104 sends 202 an AWAKE command signal to the display driver 102 over the link 116. The AWAKE command signal is sent to awaken the display driver 102 from a sleep state, while leaving the display 110 in a sleep state. Such a command is useful, for example, to prepare the display driver 102 hardware for operation in anticipation of using the display 110 to present images. This helps to reduce the latency of the device 100 as experienced by a user, which leads to a better user experience. In another embodiment, the application processor 104 at periodic intervals sends 202 the AWAKE command signal solely to detect whether the display driver 102 continues to operate properly.

With further respect to the FIG. 2 implementation, the display driver 102 is configured to send at least one synchronization signal in response to receiving the AWAKE command signal. Correspondingly, the application processor 104 expects to see the at least one synchronization signal from the display driver after sending the AWAKE command signal. Thus, the application processor 104 sets 204 a timer for a first time period. For example, the first time period is at least one frame refresh duration. During 206 the first time period, the application processor 104 monitors 208 for the synchronization signal. If the application processor 104 receives the synchronization signal before the timer expires, the device including the application processor 104 continues 212 normal operations, as there is no indication of display driver error. Normal operations may include the application processor 104 sending a signal to command the display driver 102 back into the sleep mode, or sending a signal to command the display driver 102 into the active mode.

Otherwise, if the timer expires 206 without the application processor 104 receiving the synchronization signal, the application processor 104 detects 210 a display driver error. For instance, display driver error occurs due to electrostatic discharge coming in contact with the system 100 such as by virtue of a user touching an electrostatic source or sink outside of the system 100 or touching an object at a different electrostatic potential than the system 100. Electrostatic discharge to an electronic device can occur while the user is holding or otherwise touching the housing of the electronic device or when the user is touching the display 110, such as where the display 110 incorporates a touch screen that is operated by tactile or touch input.

Referring back to the embodiment of FIG. 2, when display driver error is detected 210, the processor 104 performs 214 an error recovery routine. An example error recovery routine is one that brings the driver 102 back to normal operation. For instance, the error recovery routine includes at least reinitializing 216 the display driver 102. In a further embodiment, for instance where the error occurred while the user was manipulating a graphical user interface (UI) on the display 110, the error recover routine further includes recovering 218 the latest or last UI.

Figure 3:
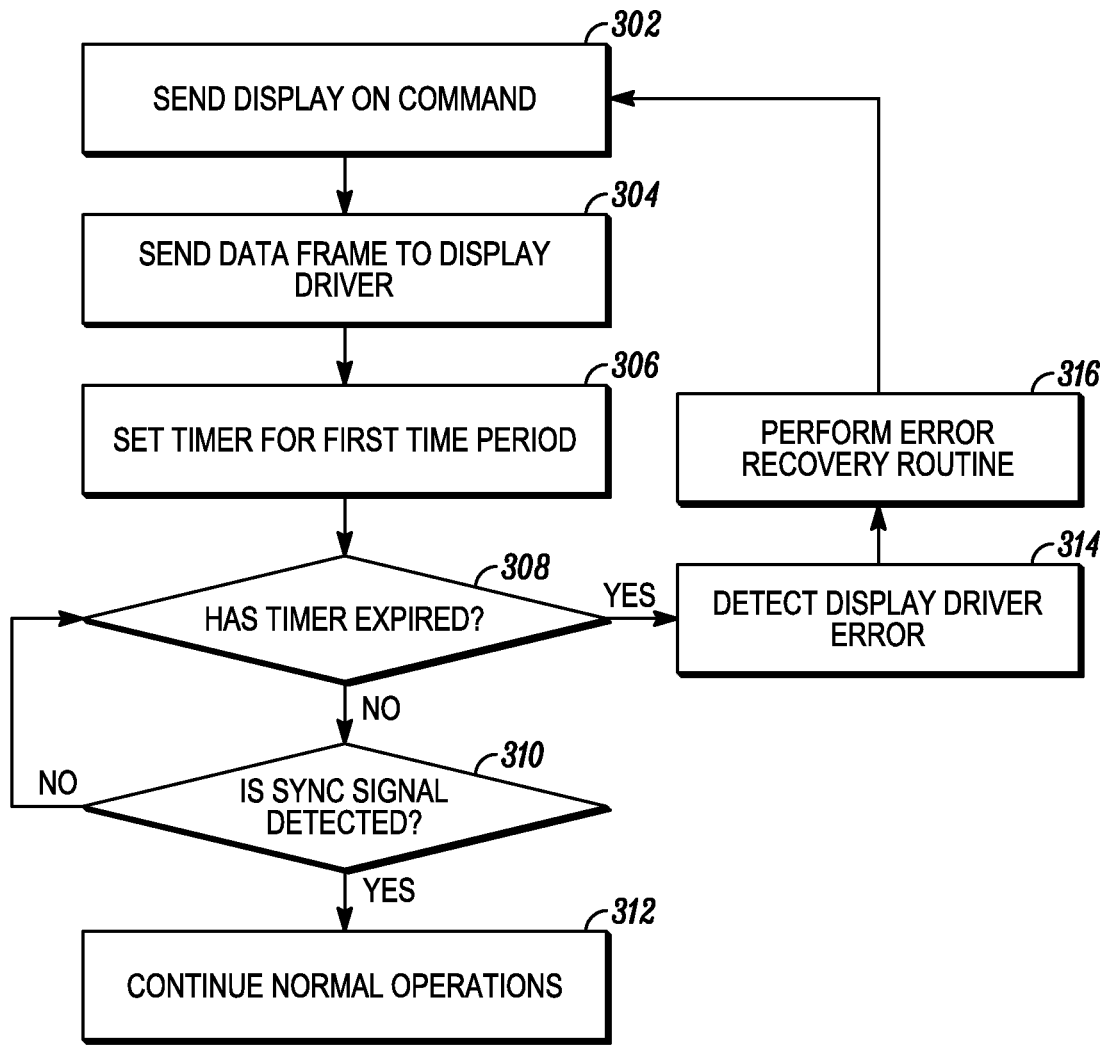
FIG. 3 is a flowchart illustrating a method of detecting display driver error in accordance with an embodiment of the present disclosure.

Turning now to FIG. 3, the application processor 104 sends 302 a DISPLAY ON command signal to the display driver 102 over the link 116. As with the embodiment illustrated by reference to FIG. 2, the display driver 102 is configured to send at least one synchronization signal in response to receiving the DISPLAY ON command signal. Correspondingly, the application processor 104 expects to see at least one synchronization signal from the display driver after sending the DISPLAY ON command signal. The application processor 104 then sends 304 image data, such as a picture frame or other type of data frame, to the display driver 102 and sets 306 a timer for a first time period. In one particular interface embodiment, the image data is sent over a unidirectional Mobile Industry Processor Interface. In another embodiment, the data is sent over a bidirectional Mobile Industry Processor Interface.

During 308 the first time period, the application processor 104 monitors 310 for one or more synchronization signal. If the application processor 104 receives the expected number of synchronization signals before the timer expires, the device including the application processor 104 continues 312 normal operations, as there is no indication of display driver error. Normal operations, in this case, include the application processor 104 uploading 304 the next image data to the RAM 118. If there are no more frames to upload, normal operations may include application processor 104 commanding the display driver 102 and the display 110 into a sleep state.

In one example implementation, the application processor 104 is configured to monitor 310 for receipt of the synchronization signal multiple times during 308 the first time period. For instance, upon awakening from the sleep state to the active state, the application processor 104 sets the timer before sending the first data. In this case, the first time period may cover a refresh period as well as an amount of time needed for the display driver to awaken and to send a corresponding command signal to awaken the display 110. The application processor 104 then monitors for a first synchronization signal during the first time period that indicates that the display driver 102 is ready to receive image data. The application processor 104 continues to monitor for a second synchronization signal that is synchronized with the display driver 102 completing the sending of the data to the display 110 and which alerts the application processor 104 to upload new image data.

Alternatively, the application processor 104 expects and monitors 310 for a single synchronization signal during the first time period, which alerts the application processor 104 to upload the new image data. In further embodiments with respect to FIG. 2 and/or FIG. 3, the display driver 104 is configured to send any predetermined number of synchronization signals during the first time period. In this case, the electronic device continues 312 normal operations only if all of the predetermined number of synchronization signals is received 310 during 308 the first time period. If the timer expires 308 with one or more expected synchronization signals failing to be received, the application processor detects 314 display driver error and executes 316 an error recovery routine, which at least includes getting the display driver 102 back to normal operation, for instance through a rebooting function.

Figure 4:
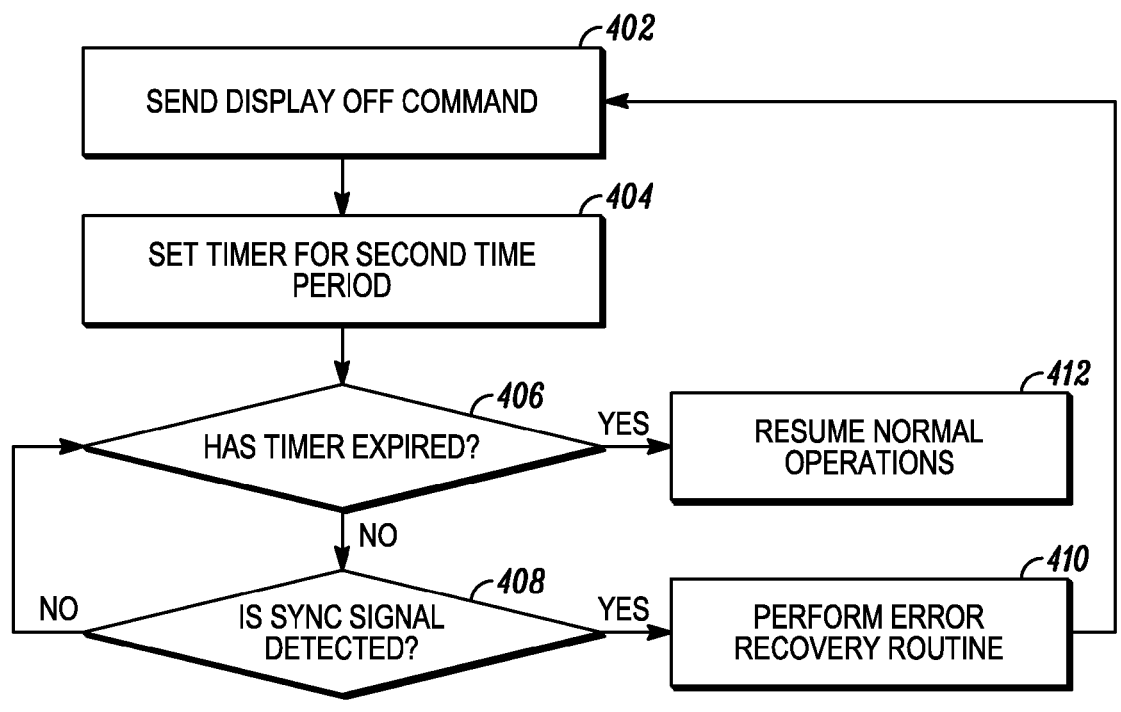
FIG. 4 is a flowchart illustrating a method of detecting display driver error in accordance with an embodiment of the present disclosure.

Referring now to the embodiment illustrated in FIG. 4, the application processor 104 sends 402 a DISPLAY OFF command signal to the display driver 102 over the link 116. The DISPLAY OFF command signal is sent to cause the display 110 and the display driver 102 to return to a sleep state. Such a command is useful, for example, to conserve battery life in the electronic device 100. Accordingly, the display driver 102 is configured to withhold sending a synchronization signal in response to receiving the DISPLAY OFF command signal. Correspondingly, the application processor 104 does not expect a synchronization signal from the display driver after sending the DISPLAY OFF command, since the display 110 should be off, and the display driver 102 should no longer continue to send image data to the display.

Thus, to detect an error, the application processor 104 sets 404 a timer for a second time period and monitors 408 for receipt of a synchronization signal during 406 the second time period. The second time period could have a time value that is equivalent to the first time period but need not necessarily have the same time value. In this embodiment, the application processor 104 detects display driver error if a synchronization signal is detected 408 during the second time period, since the display driver 102 should have ceased sending synchronization signals. Upon detecting the display error, the application processor 104 performs 410 an error recovery routine, such as rebooting the display driver 102. However, if the application processor 104 fails to detect 408 a synchronization signal before the timer expires, the device that includes the application processor 104 continues 412 normal operations. Normal operations might include, at some later time, commanding the display driver 102 to an awake state as described by reference to FIG. 2 or to an ON state as described be reference to FIG. 3.

Embodiments illustrated in FIGS. 2, 3, and 4 may also be combined in a single method that is executed by the application processor 104 to detect display driver error. For example, the method includes the application processor 104 sending a first command signal to a display driver 102 to operate according to a first operating state that includes the display driver 102 sending a synchronization signal and monitors for the synchronization signal during a first time period after sending the first command signal. The method further includes the application processor sending a second command signal to the display driver 102 to operate according to a second operating state that includes the display driver 102 withholding sending the synchronization signal and monitoring for the synchronization signal during a second time period after sending the second command signal. The application processor 104 detects a display driver error based on results of the monitoring during the first or the second time periods or both. In the combined embodiment, the display driver error is detected when the synchronization signal is received during the second time period, where no synchronization signal should be received. The display driver error is also detected upon failing to receive the synchronization signal during the first time period, where at least one synchronization signal should be received.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting display driver error, the method comprising:
   sending a first command signal to a display driver to operate according to a first operating state that comprises the display driver sending a synchronization signal;
   monitoring for the synchronization signal during a first time period after sending the first command signal; and
   detecting the display driver error upon failing to receive the synchronization signal during the first time period.

2. The method of claim 1 further comprising:
   sending a second command signal to the display driver to operate according to a second operating state that comprises the display driver withholding sending the synchronization signal;
   monitoring for the synchronization signal during a second time period after sending the second command signal;
   detecting the display driver error when the synchronization signal is received during the second time period.

3. The method of claim 1, wherein the first operating state comprises the display driver awakening from a sleep state and sending the synchronization signal.

4. The method of claim 1, wherein the first operating state comprises the display driver sending first data to a display, and sending the synchronization signal to synchronize receipt of second data to send to the display.

5. The method of claim 4, wherein monitoring for the synchronization signal during the first time period comprises monitoring for receipt of the synchronization signal multiple times during the first time period.

6. The method of claim 4, wherein the first data is sent over a unidirectional Mobile Industry Processor Interface.

7. The method of claim 4, wherein the first data is sent over a bidirectional Mobile Industry Processor Interface.

8. The method of claim 4, wherein the synchronization signal comprises a signal sent to prevent screen tearing while displaying a frame on the display.

9. A system for detecting display driver error, the system comprising:
   a display driver configured to send a synchronization signal after receiving a first command signal to operate according to a first operating state;
   a processor configured to be coupled to the display driver over an interface, wherein the processor is configured to:
      send the first command signal; initiate a timer for a first time period;
      monitor for the synchronization signal during the first time period; and
      detect the display driver error upon failing to receive the synchronization signal during the first time period.

10. The system of claim 9: wherein the display driver is further configured to operate according to a second operating state after receiving a second command signal, wherein the second operating state comprises the display driver withholding sending the synchronization signal; wherein the processor is further configured to: send the second command signal; initiate a second timer for a second time period; monitor for the synchronization signal during the second time period; detect the display driver error when the synchronization signal is received during the second time period.

11. The system of claim 9, wherein the display driver is configured to awaken from a sleep state and send the synchronization signal in response to the first command signal.

12. The system of claim 9, wherein the display driver is configured, while in the first operating state, to send first data to the display and send the synchronization signal to the processor to synchronize sending second data to the display driver.

13. The system of claim 12, wherein the processor is configured to monitor for receipt of the synchronization signal multiple times during the first time period.

14. The system of claim 9, wherein the interface comprises a unidirectional Mobile Industry Processor Interface.

15. The system of claim 9, wherein the interface comprises a bidirectional Mobile Industry Processor Interface.

16. A method for detecting display driver error, the method comprising:
 sending a first command signal to a display driver to operate according to a first operating state that comprises the display driver sending a synchronization signal;
 monitoring for the synchronization signal during a first time period after sending the first command signal;
 sending a second command signal to the display driver to operate according to a second operating state that comprises the display driver withholding sending the synchronization signal;
 monitoring for the synchronization signal during a second time period after sending the second command signal; and
 detecting the display driver error based on results of the monitoring during at least one of the first or the second time periods.

17. The method of claim 16, wherein the display driver error is detected when the synchronization signal is received during the second time period.

18. The method of claim 16, wherein the display driver error is detected upon failing to receive the synchronization signal during the first time period.

19. The method of claim 16, wherein the first operating state comprises the display driver awakening from a sleep state while the display is in an off state and sending the synchronization signal to synchronize receipt of first data for a first picture frame.

20. The method of claim 16, wherein the first operating state comprises the display driver sending first data for a first picture frame to the display and sending the synchronization signal, which is synchronized to the display driver completing the sending of the first data to the display.

* * * * *